7222X
O. WILLIS.
Ore Washer.
Patented Sept. 5, 1832.
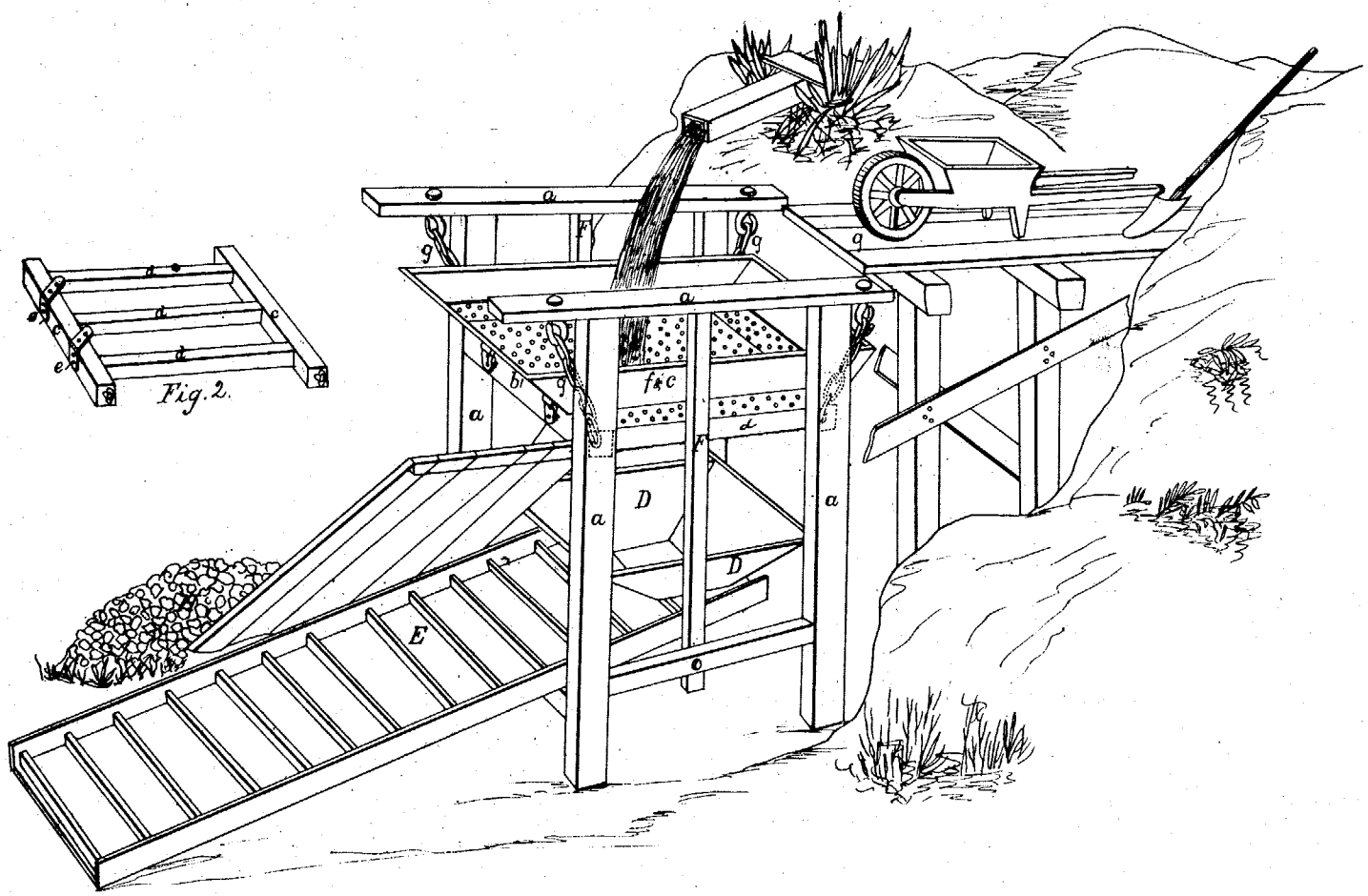
THE NORRIS PETERS CO., PHOTO-LITHO., WASHINGTON, D. C.

7222X

Oscar Willis
Letters Patent

The Schedule referred to in these Letters Patent and making part of the same containing a description in the words of the said Oscar Willis himself of his improvement upon the Rail way Car Gold Riddle previously patented by him now called the swinging Riddle To all to whom these presents shall come:

Be it known that I Oscar Willis of the County of Burke & State of North Carolina have invented a new & useful improvement in the Rail way Car Gold Riddle which he calls the swinging Riddle & that the following is a full & exact description of the construction & operation of said Machine as invented by me.

The frame is made of timber of any convenient size 4 feet 6 inches long 2 feet 8 inches wide with four posts 6 feet high. upon the frame lengthways rests two plates 6 feet 6 inches long & projecting one foot over the posts. C.C. represent two axles 2 feet 6 inches long connected by three cross pieces 2 feet long which forms a frame upon which the riddle rests; four chains are attached to the axles C.C. & suspended to the ends of the plates & isolates the riddle from the hopper below. b. represents a riddle made of plank, three feet six inches long two feet wide & eight inches deep with an inclination at each end of forty five degrees. lined & bottomed with sheet iron, perforated with holes. one end of the riddle turns upon one of the axles by means of hinges, while the other end may be raised with the hand. D.D. represents the hoppers under the riddle two [one] inches from the bottom of the frame & filling it with an aperture at its bottom 8 inches square— F.F. are side pieces extending up the sides of the riddle to prevent it from playing sideways. The ripple is represented by E. & is placed with its end under the aperture of the hopper with an inclination greater or less as circumstances may require. 30 inches wide ten feet long & six inches deep with the ripples three inches deep and six inches apart. This Machine operates in the following manner. The grit or gravel is Drawing [illegible]

[illegible] 72222X is thrown from a table or platform by a wheelbarrow into the riddle, a lever is placed at that end of the riddle, detached from the axle or frame and by swinging it backwards and forwards, give a peculiar action to the gravel & is speedily washed by water thrown upon it in the usual manner.

The gravel when washed is thrown out of the riddle, by elevating that end of it loose & unconnected with the axle or small frame into a wheelbarrow.

My claim in this invention is entire with the exception of the riffle. The improvement for which I am desirous of obtaining a Patent is the suspending the riddle upon chains at right angles to the inclined plane upon which the wheels of my Railway car [illegible] Riddle ascend or descend and give it a similar action Oscar Willis Test. Witnesses
W. H. [illegible] Henderson
Wm. C Erwin T574 [illegible]